(12) United States Patent
Coope et al.

(10) Patent No.: US 7,458,169 B1
(45) Date of Patent: Dec. 2, 2008

(54) LOCATOR DOWEL ASSEMBLY

(76) Inventors: Robert L. Coope, 42 W. Marlette Ave., Phoenix, AZ (US) 85013; Gordon R. Coope, 18014 N. 63rd La., Glendale, AZ (US) 85308

( * ) Notice: Subject to any disclaimer, the term of this patent is extended or adjusted under 35 U.S.C. 154(b) by 29 days.

(21) Appl. No.: 11/765,304

(22) Filed: Jun. 19, 2007

Related U.S. Application Data

(60) Provisional application No. 60/814,911, filed on Jun. 19, 2006.

(51) Int. Cl.
*G01B 5/24* (2006.01)
(52) U.S. Cl. ...................................................... 33/645
(58) Field of Classification Search .................. 33/613, 33/626, 645, 655
See application file for complete search history.

(56) References Cited

U.S. PATENT DOCUMENTS

| | | | | |
|---|---|---|---|---|
| 3,212,181 A * | 10/1965 | Henle | ........................... | 33/613 |
| 3,722,360 A * | 3/1973 | Blakey et al. | .................. | 33/613 |
| 3,723,928 A * | 3/1973 | Blakey et al. | .................. | 33/567 |
| 4,538,355 A * | 9/1985 | Morghen | ...................... | 33/613 |
| 4,593,450 A * | 6/1986 | Dumire | ........................ | 33/613 |
| 4,834,358 A * | 5/1989 | Okolischan et al. | ......... | 269/900 |
| 6,161,296 A * | 12/2000 | Davio | ........................... | 33/645 |
| 6,722,052 B2 * | 4/2004 | Wu | .............................. | 33/613 |
| 2004/0003508 A1 * | 1/2004 | Wu | .............................. | 33/613 |
| 2006/0137203 A1 * | 6/2006 | Jensen et al. | ................... | 33/645 |

* cited by examiner

*Primary Examiner*—G. Bradley Bennett
(74) *Attorney, Agent, or Firm*—Parsons & Goltry; Robert A. Parsons; Michael W. Goltry

(57) ABSTRACT

A locator dowel assembly for locating a fixture plate relative to a base plate. The assembly includes a bushing designed to be frictionally engaged in an opening in the fixture plate and define a central opening extending through the bushing and the fixture plate. A locator dowel with an elongated body has a tool engaging feature at one end. The locator dowel has a diameter slightly smaller than the diameter of the bushing to allow sliding movement therebetween. Stop and capture apparatus includes a longitudinally extending slot in the outer periphery of the locator dowel and a stop member positioned in the inner wall of the bushing and extending radially into the central opening. The stop member is engaged in the slot in the locator dowel and forms a stop to limit vertical movement of the locator dowel in the bushing and capturing the locator dowel in the bushing.

13 Claims, 3 Drawing Sheets

LOCATOR DOWEL ASSEMBLY

CROSS REFERENCE TO RELATED APPLICATION

This application claims the benefit of U.S. Provisional Application No. 60/814,911, filed 19 Jun. 2006.

FIELD OF THE INVENTION

This invention generally relates to apparatus for locating components, such as holding fixtures, in tools during manufacturing.

BACKGROUND OF THE INVENTION

In manufacturing of various articles it is often necessary to locate fixture plates on a base plate of the tool used to perform an operation. In general, a large variety of tools, such as drill presses, lathes, routers, milling machines, etc. may be used in manufacturing articles. Each time the material being formed into the articles is switched from one tool to the next, it must be aligned with the tool to ensure proper operation. Also, because large numbers of articles may be manufactured, each time new material is placed in the machine it must be aligned, which requires a large amount of machining time.

To at least partially overcome these problems, fixture plates have been developed which hold the material being worked on and are pinned to a base plate of the tool or machine. The fixture plates have a plurality of holed extending therethrough which mate with holes in the base plate and screws or pins extend into the holes to fix the position of the fixture plate relative to the base plate. One problem with this procedure is that the screws or pins are not sufficiently accurate. Also, each time an operator wants to attach a fixture plate to a base plate the pins and/or screws must be retrieved from where ever they were placed when they were removed from the previous operation. This procedure is generally time consuming and frustrating.

To overcome the accuracy problem, locator dowels have been developed in the prior art that incorporate a number of balls around the periphery. A central screw forces the balls radially outwardly to lock the locator dowel in place. A problem with this structure is that it is extremely complicated and relatively expensive to fabricate. No structures have been suggested to overcome the problem of using loose screws and/or pins.

It would be highly advantageous, therefore, to remedy the foregoing and other deficiencies inherent in the prior art.

Accordingly, it is an object of the present invention to provide a new and improved locator dowel assembly for positioning a component, such as a fixture plate, on the base plate of a tool or the like.

Another object of the invention is to provide a new and improved locator dowel assembly with captured components so that searching for components is eliminated.

Another object of the invention is to provide a new and improved locator dowel assembly that is relatively inexpensive and easy to fabricate.

SUMMARY OF THE INVENTION

The above objects and others are realized in a locator dowel assembly for locating a fixture plate relative to a base plate. The assembly includes a bushing designed to be frictionally engaged in an opening in the fixture plate and define a central opening extending through the bushing and the fixture plate. A locator dowel with an elongated body has a tool engaging feature at one end. The locator dowel has a diameter slightly smaller than the diameter of the bushing to allow sliding movement therebetween. Stop and capture apparatus includes a longitudinally extending slot in the outer periphery of the locator dowel and a stop member positioned in the inner wall of the bushing and extending radially into the central opening. The stop member is engaged in the slot in the locator dowel and forms a stop to limit vertical movement of the locator dowel in the bushing and capturing the locator dowel in the bushing.

In a preferred embodiment the stop and capture mechanism includes a longitudinally extending slot in the outer periphery of the locator dowel extending from a mid point to the lower end of the locator dowel. A pin is fixedly positioned in the inner wall of the bushing and extends radially into the central opening. The pin is engaged in the longitudinally extending slot in the locator dowel so that the slot forms a stop to limit vertical downward movement of the locator dowel in the bushing. A removable stop is attached to the lower end of the locator dowel across the lower end of the longitudinally extending slot to form a stop to limit vertical upward movement of the locator dowel in the bushing and to capture the locator dowel in the bushing. The removable stop is removably attached to the locator dowel to allow dismantling and removal of the locator dowel from the bushing.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF A PREFERRED EMBODIMENT

Figure 1:
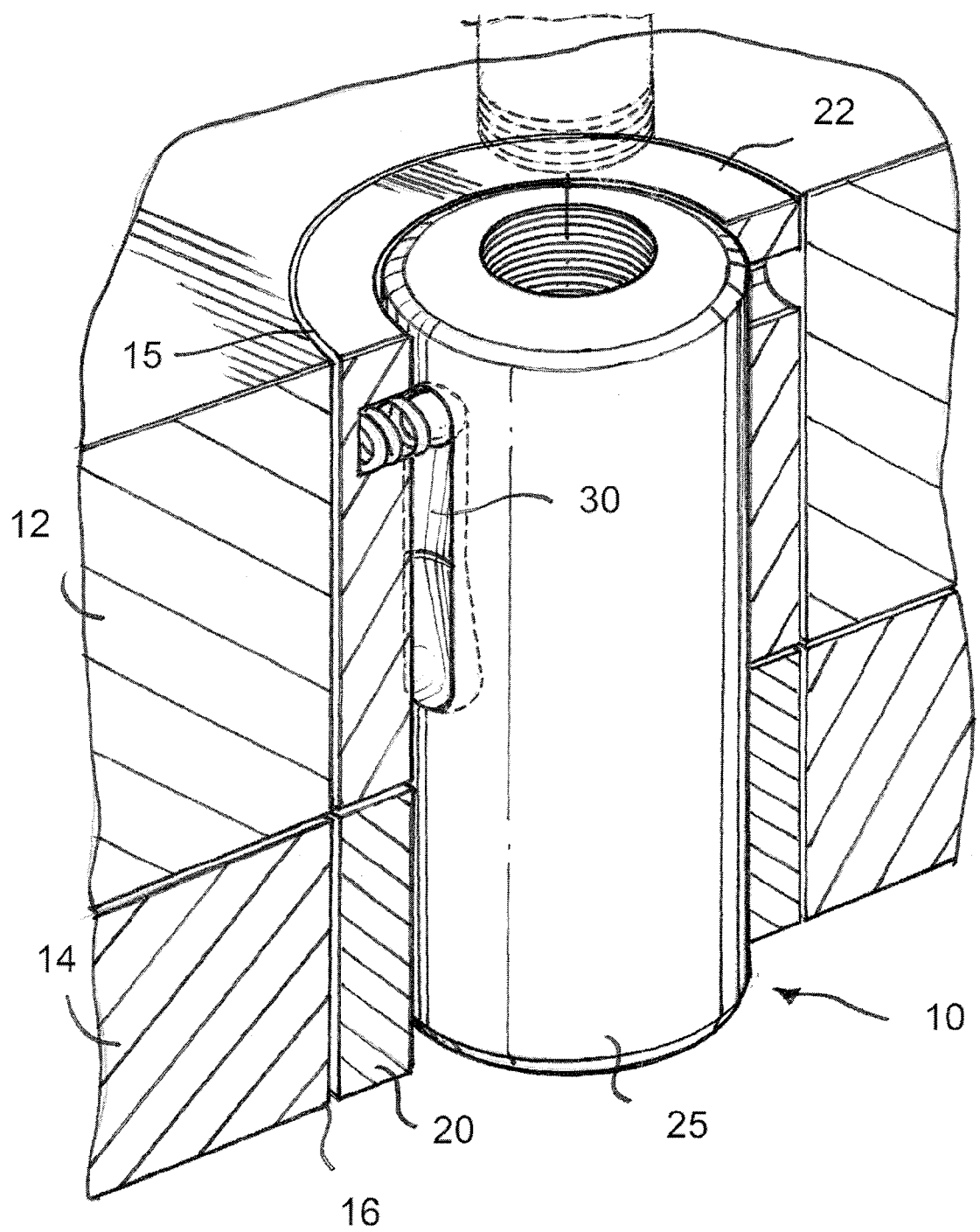
FIG. 1 is a view in perspective of a locator dowel assembly locating a fixture plate on a base plate, in accordance with the present invention, portions thereof removed and shown in section.
Figure 2:
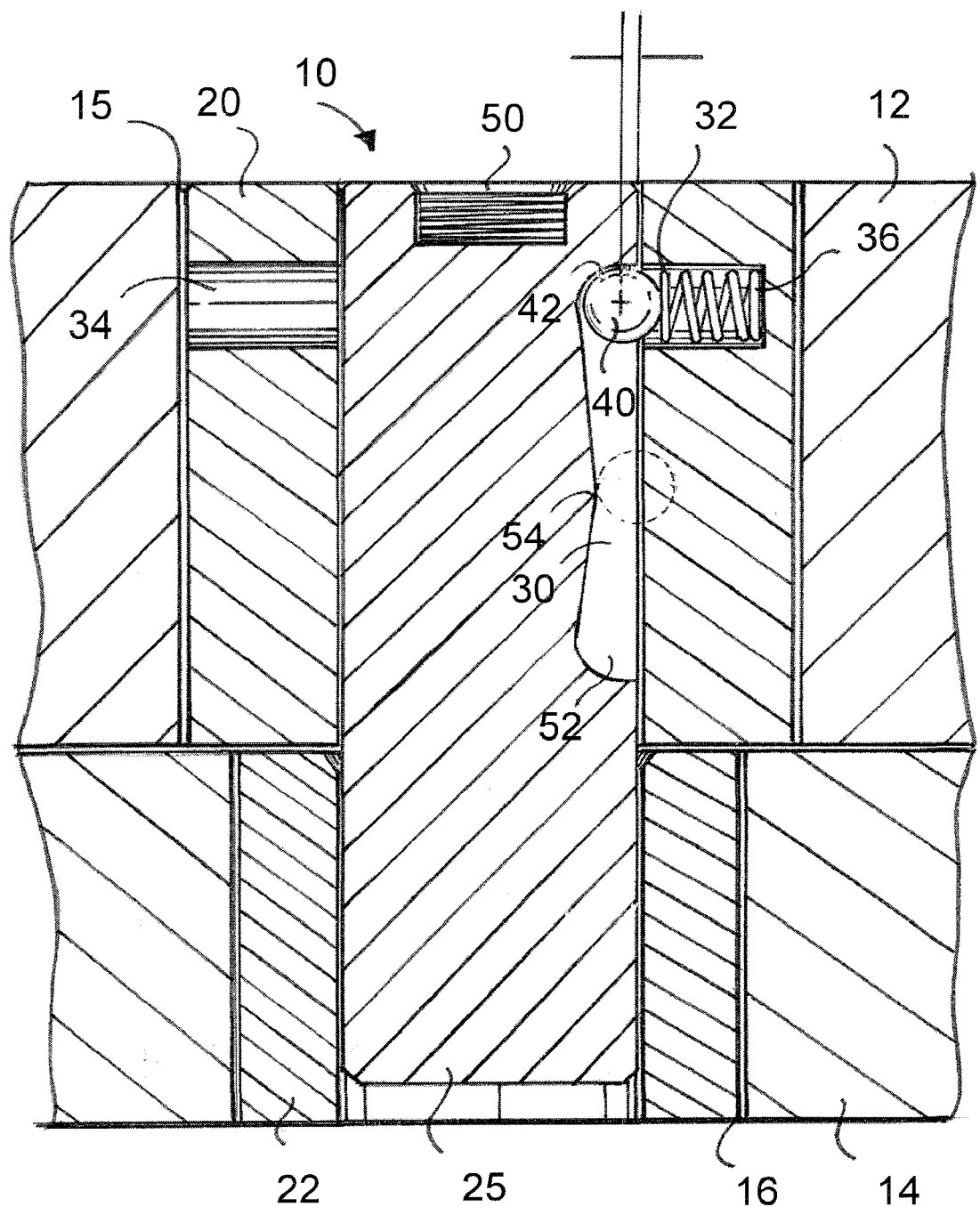
FIG. 2 is sectional view through the locator dowel assembly, fixture plate, and base plate of FIG. 1.

Turning now to FIGS. 1 and 2, which illustrate a locator dowel assembly, generally designated 10, positioning a fixture plate 12 on a base plate 14. It will be understood by those skilled in the art that fixture plate 12 has at least two locating holes therethrough, only one of which (designated 15) is illustrated and will be discussed herein for convenience of understanding. Also, mating locator holes are formed in or through base plate 14, only one hole 16 being illustrated. Also, as understood in the art, hole 15 through fixture plate 12 is axially aligned with hole 16 in base plate 14.

A precision bushing 20 is frictionally engaged in hole 15 through fixture plate 12 and includes a very precise inner diameter. A precision bushing 22 is frictionally engaged in hole 16 in base plate 14. The length of bushing 20 is approximately the same as the thickness of fixture plate 12 and the length of bushing 22 is the same or less than the thickness of base plate 14, so that when frictionally engaged in holes 15 and 16, respectively, they do not extend beyond either the upper or lower surfaces of fixture plate 12 and base plate 14. While the length of bushing 20 could be slightly less than the thickness of the receiving plate, it is not generally desired as the opening would be prone to the accumulation of debris and dirt.

Also, in FIG. 1 the inner diameter of hole 15 through fixture plate 12 is substantially the same as the inner diameter of hole 16 through base plate 14 for convenience in forming the holes. However, in some applications (see FIG. 2) it may be desirable to form the inner diameter of hole 15 larger than the inner diameter of hole 15 so that when locator dowel assembly 10 is frictionally engaged in the axial opening extending through bushing 20 and bushing 22, bushing 20 is not inadvertently pushed into bushing 22, forcing both bushings downwardly partially or totally out of their associated holes. In this instance the lower surface of bushing 20 will butt against the upper surface of base plate 14 to prevent further movement.

Locator dowel assembly 10 includes an elongated dowel or locator dowel 25 with a length slightly less than the combined lengths of holes 20 and 22. By making the length of locator dowel 25 slightly less than the combined lengths, locator dowel 25 can be inserted so that the upper surface is flush with the upper surface of fixture plate 12 and no depression will be formed to accumulate dirt and debris. Also, by inserting locator dowel 25 into holes 20 and 22 so the upper surface is flush with the upper surface of fixture plate 12, no portion remains above the surface to interfere with material or structures held by fixture plate 12 or any work being accomplished.

Locator dowel 25 has an outer diameter substantially the same as the inner diameter of bushings 20 and 22 so that locator dowel 25 can be frictionally engaged in bushings 20 and 22 with no radial movement. Thus, when locator dowel 25 is frictionally engaged in bushings 20 and 22, as illustrated in FIG. 1 or 2, fixture plate 12 is very accurately positioned relative to base plate 14.

A stop and capture mechanism is located in cooperation between locator dowel 25 and bushing 22 to limit movement of locator dowel 25 and capture locator dowel 25 in bushing 20. In this embodiment the stop and capture mechanism includes an elongated slot in the surface of locator dowel 25 and a ball 40 in movable engagement therewith. Locator dowel 25 has an elongated channel or slot 30 formed in the outer diameter and extending longitudinally from adjacent the upper surface to a mid point slightly beyond the center of the length. A blind hole 32 is formed in the inner surface of bushing 20, for example by drilling a hole (designated 34) along a diameter from the outer surface opposite the desired position of blind hole 32, through bushing 20 and into the inner surface. A helical compression spring 36 is positioned in blind hole 32 and provides a bias on a ball 40 also positioned partially in blind hole 32 and partially in slot 30.

Helical compression spring 36 biases ball 40 into slot 30 where it operates as a stop to prevent locator dowel 25 from being inserted too far into bushings 20 and 22. That is, slot 30 is formed with an upper end 42 that engages ball 40 when the upper surface of locator dowel 25 is flush with the upper surface of fixture plate 12 and bushing 20 to prevent further insertion of locator dowel 25 into bushings 20 and 22. Also the depth of slot 30, at upper end 42, is slightly greater than the diameter of ball 40 to prevent rotation of locator dowel 25 in bushings 20 and 22.

Locator dowel 25 is also provided with an internally threaded opening 50 coaxially positioned in the upper surface and extending axially a short distance into locator dowel 25. When it is desired to remove locator dowel 25 from bushing 22 and release fixture plate 12 from base plate 14, an elongated threaded tool (not shown) is threaded into hole 50 and an upward force is provided to extract locator dowel 25 from bushing 22. The extraction tool can be similar to a gear puller or a type of inverted hammer element (similar to an inverted pipe driver). In operation, locator dowel 25 can be extracted longitudinally until ball 40 engages a lower end 52 of slot 30, at which time locator dowel 25 is completely withdrawn from bushing 22. However, locator dowel 25 is captured in bushing 20 to become essentially a part thereof. The depth of slot 30, at lower end 52, is slightly greater than the diameter of ball 40 to prevent rotation of locator dowel 25 in bushing 20.

Here it should be noted that the depth of slot 30 at approximately the mid-point, designated 54, is slightly less than half the diameter of ball 40. Thus, if it is desired to disengage locator dowel 25 from bushing 20 for any reason (e.g. wear or the like), locator dowel 25 is positioned so that ball 40 is at approximately mid-point 54 in slot 30. At this point, ball 40 is more than half out of slot 30 and locator dowel 25 can be rotated a few degrees to force ball 40 laterally into blind hole 32 and completely out of slot 30. Locator dowel 25 can then be extracted from bushing 20 for maintenance or other activity.

Figure 3:
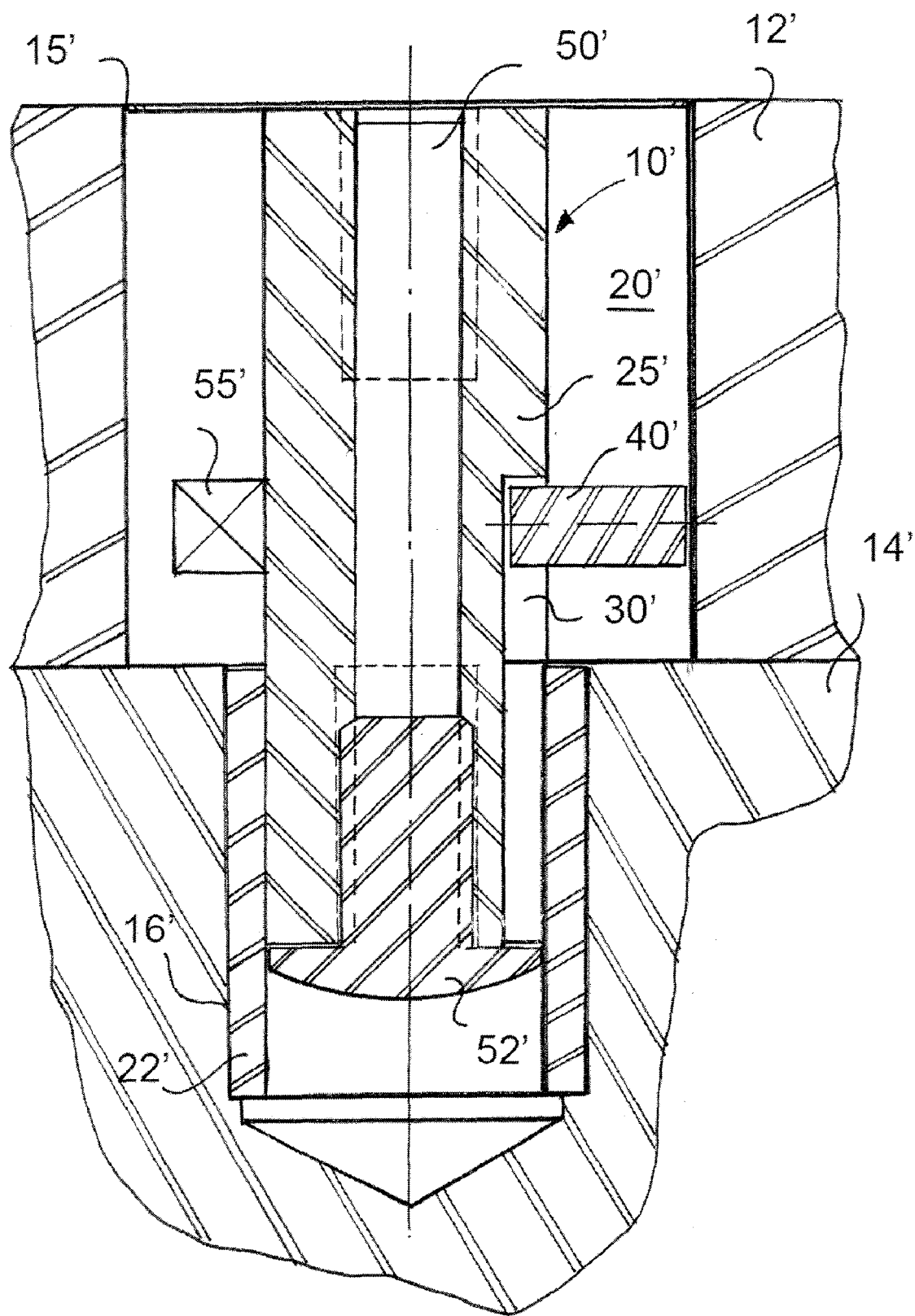
FIG. 3 is a sectional view similar to FIG. 2 of another embodiment of a locator dowel assembly in accordance with the present invention.

Turning now to FIG. 3, which illustrates a preferred embodiment of a locator dowel assembly, generally designated 10', positioning a fixture plate 12' on a base plate 14'. In this embodiment, components similar to components illustrated and explained with relation to FIGS. 1 and 2 are designated with similar numbers and a prime (') is added to denote the different embodiment. It will be understood by those skilled in the art that fixture plate 12' has at least two locating holes therethrough, only one of which (designated 15') is illustrated and will be discussed herein for convenience of understanding. Also, mating locator holes (generally an equal number) are formed in or through base plate 14', only one hole 16' being illustrated. Also, as understood in the art, hole 15' through fixture plate 12' is axially aligned with hole 16' through base plate 14'. It will be understood that hole 16' can extend through base plate 14', but is more typically formed as a blind hole from a top surface thereof.

A precision bushing 20' is frictionally engaged in hole 15' through fixture plate 12' and includes a very precise inner diameter. A precision bushing 22' is frictionally engaged in hole 16' through base plate 12'. The length of bushings 20' is approximately the same as the thickness of fixture plate 12' and the length of bushing 22' is the same as or less than the thickness of base plate 14', so that when frictionally engaged in holes 15' and 16', respectively, they do not extend beyond either the upper or lower surfaces of fixture plate 12' and base plate 14'. While the lengths of the bushing 20' could be slightly less than the thickness of the receiving plate it is not generally desired as the opening would be prone to the accumulation of debris and dirt.

Also, in some embodiments it may be convenient to form the inner diameter of hole 15' through fixture plate 12' substantially the same as the inner diameter of hole 16' through base plate 14' for convenience in forming the holes. However, in some applications (see FIG. 3) it may be desirable to form the inner diameter of hole 15' larger than the inner diameter of hole 16' so that when locator dowel assembly 10' is frictionally engaged in the axial opening extending through bushing 20' and bushing 22', bushing 20' is not inadvertently pushed into bushing 22', forcing both bushings downwardly partially or totally out of their associated holes. In this instance the lower surface of bushing 20' will butt against the upper surface of base plate 14' to prevent further movement.

Locator dowel assembly 10' includes an elongated dowel or locator dowel 25' with a length slightly less than the combined lengths of holes 20' and 22'. By making the length of locator dowel 25' slightly less than the combined lengths, locator dowel 25' can be inserted so that the upper surface is flush with the upper surface of fixture plate 12' and no depression will be formed to accumulate dirt and debris. Also, by inserting locator dowel 25' into holes 20' and 22' so the upper surface is flush with the upper surface of fixture plate 12', no portion remains above the surface to interfere with material or structures held by fixture plate 12' or any work being accomplished.

Locator dowel 25' has an outer diameter substantially the same as the inner diameter of bushings 20' and 22' so that locator dowel 25' can be frictionally engaged in bushings 20' and 22' with no radial movement. Thus, when locator dowel 25' is frictionally engaged in bushings 20' and 22', as illustrated in FIG. 3, fixture plate 12' is very accurately positioned relative to base plate 14'.

A stop and capture mechanism is located in cooperation between locator dowel 25' and bushing 22' to limit movement of locator dowel 25' and capture locator dowel 25 in bushing 20. In this embodiment the stop and capture mechanism associated with locator dowel 25' includes an elongated channel or slot 30' formed in the outer diameter and extending longitudinally from adjacent a mid point slightly beyond the center of the length to the lower end. A radially inwardly extending pin 40' is fixedly engaged in the inner wall of bushing 20' so as to extend into slot 30' and operate as a stop to limit the longitudinal (vertical) movement of locator dowel 25'. Pin 40' can be fixed in a hole bushing 20' by frictionally press fitting it in an opening, threaded engagement, etc.

A lower limit removable stop is removably attached to the lower end of locator dowel 25' to operate as a lower movement limiter and to capture locator dowel 25' in bushing 20'. In this preferred embodiment, the limit stop is in the form of a shoulder screw 52' that is threadedly engaged in an opening in the bottom end of locator dowel 25' and extends over the lower end of slot 30' to operate as an upward movement limiter. Thus, the combination of slot 30', pin 40' and shoulder screw 52' operate to capture locator dowel 25' in the opening in bushing 20'. Locator dowel 25' may be removed from bushing 20 if required for maintenance, cleaning, or repair by unscrewing shoulder screw 52' from the lower end of locator dowel 25'.

A spring compression system 55' is positioned in a hole in the inner wall of bushing 20' and presses against the outer surface of locator dowel 25' preventing locator dowel 25' from dropping to its lowest position under the impetus of gravity. Spring compression system 55' can be, for example, a compression spring and a pad that bears against the surface of locator dowel 25' to reduce or restrain vertical movement during assembly or locating operations.

Locator dowel 25' is also provided with an internally threaded opening 50' coaxially positioned in the upper surface and extending axially a short distance into locator dowel 25'. When it is desired to remove locator dowel 25' from bushing 22' and release fixture plate 12' from base plate 14', an elongated threaded tool (not shown) is threaded into hole 50' and an upward force is provided to extract locator dowel 25' from bushing 22'. The extraction tool can be similar to a gear puller or a type of inverted hammer element (similar to an inverted pipe driver). In operation, locator dowel 25' can be extracted longitudinally until pin 40' engages shoulder screw 52', at which time locator dowel 25' is completely withdrawn from bushing 22'. However, locator dowel 25' is captured in bushing 20' to become essentially a part thereof.

Thus, a new and novel locator dowel assembly has been disclosed. The locator dowel assembly is useful for locating components such as a fixture plate on the base plate of a manufacturing tool. Also, the locator dowel assembly is captured in a bushing frictionally engaged in a hole in the fixture plate so that it is always readily available and an operator does not have to spend time searching for it. Further, the locator dowel assembly engages the fixture plate and a base plate so as to be flush with the upper surface of the fixture plate to reduce interference with manufacturing operations and to reduce accumulated debris.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A locator dowel assembly for locating a fixture plate with an opening therethrough relative to a base plate with a hole, the assembly comprising:
    a bushing designed to be frictionally engaged in the opening in the fixture plate and including an inner wall thereof defining a central opening extending through the bushing and the fixture plate, the central opening having a constant diameter along the length thereof;
    a locator dowel having an elongated body and having a tool engaging feature at an externally accessible portion, the locator dowel having a diameter slightly smaller than the constant diameter of the bushing to allow relative sliding movement therebetween; and
    stop and capture apparatus including a longitudinally extending slot in the outer periphery of the locator dowel and a stop member positioned in the inner wall of the bushing and extending radially into the central opening, the stop member being engaged in the longitudinally extending slot in the locator dowel, the slot forming a stop to limit vertical movement of the locator dowel in the bushing and capturing the locator dowel in the bushing.

2. A locator dowel assembly as claimed in claim 1 wherein the stop member includes a pin fixed in the inner wall of the bushing and extending radially outwardly into the slot in the outer periphery of the locator dowel.

3. A locator dowel assembly as claimed in claim 2 wherein the longitudinally extending slot in the outer periphery of the locator dowel extends from a mid point to the lower end of the locator dowel.

4. A locator dowel assembly as claimed in claim 3 wherein the stop and capture apparatus further includes a removable stop attached to the lower end of the locator dowel across the lower end of the longitudinally extending slot to form a stop to limit vertical upward movement of the locator dowel in the bushing and to capture the locator dowel in the bushing, the removable stop being removably attached to the locator dowel to allow dismantling and removal of the locator dowel from the bushing.

5. A locator dowel assembly as claimed in claim 1 further including a spring compression system positioned in the inner wall of the bushing and bearing against the locator dowel to restrain vertical movement due to gravity.

6. A locator dowel assembly as claimed in claim 1 wherein the stop member includes a ball positioned in an opening in the inner wall of the bushing and biased radially into the longitudinally extending slot.

7. A locator dowel assembly for locating a fixture plate with an opening therethrough relative to a base plate with a hole, the assembly comprising:

a bushing designed to be frictionally engaged in the opening in the fixture plate and including an inner wall thereof defining a central opening extending through the bushing and the fixture plate, the central opening having a constant diameter along the length thereof;

a locator dowel having an elongated body and having a tool engaging feature at an externally accessible portion, the locator dowel having a diameter slightly smaller than the constant diameter of the bushing to allow relative sliding movement therebetween;

stop and capture apparatus including a longitudinally extending slot in the outer periphery of the locator dowel and a stop member positioned in the inner wall of the bushing and extending radially into the central opening, the stop member being engaged in the longitudinally extending slot in the locator dowel, the slot forming a stop to limit vertical movement of the locator dowel in the bushing and capturing the locator dowel in the bushing; and a spring compression system positioned in the inner wall of the bushing and bearing against the locator dowel to restrain vertical movement due to gravity;

the locator dowel and bushing being designed to cooperate to accurately position the fixture plate relative to the base plate with the locator dowel extending through the central opening of the bushing and into the hole in the base plate.

8. A locator dowel assembly as claimed in claim 7 wherein the stop member includes a pin fixed in the inner wall of the bushing and extending radially outwardly into the slot in the outer periphery of the locator dowel.

9. A locator dowel assembly as claimed in claim 8 wherein the longitudinally extending slot in the outer periphery of the locator dowel extends from a mid point to the lower end of the locator dowel.

10. A locator dowel assembly as claimed in claim 9 wherein the stop and capture apparatus further includes a removable stop attached to the lower end of the locator dowel across the lower end of the longitudinally extending slot to form a stop to limit vertical upward movement of the locator dowel in the bushing and to capture the locator dowel in the bushing, the removable stop being removably attached to the locator dowel to allow dismantling and removal of the locator dowel from the bushing.

11. A locator dowel assembly as claimed in claim 7 wherein the stop member includes a ball positioned in an opening in the inner wall of the bushing and biased radially into the longitudinally extending slot.

12. A locator dowel assembly for locating a fixture plate with an opening therethrough relative to a base plate with a hole, the assembly comprising:

a bushing designed to be frictionally engaged in the opening in the fixture plate and including an inner wall thereof defining a central opening extending through the bushing and the fixture plate, the central opening having a constant diameter along the length thereof;

a locator dowel having an elongated body and having a tool engaging feature at an externally accessible portion, the locator dowel having a diameter slightly smaller than the constant diameter of the bushing to allow relative sliding movement therebetween, and a longitudinally extending slot in the outer periphery of the locator dowel extending from a mid point to the lower end of the locator dowel;

a pin fixedly positioned in the inner wall of the bushing and extending radially into the central opening, the pin being engaged in the longitudinally extending slot in the locator dowel, the slot forming a stop to limit vertical downward movement of the locator dowel in the bushing;

a removable stop attached to the lower end of the locator dowel across the lower end of the longitudinally extending slot to form a stop to limit vertical upward movement of the locator dowel in the bushing and to capture the locator dowel in the bushing, the removable stop being removably attached to the locator dowel to allow dismantling and removal of the locator dowel from the bushing; and a spring compression system positioned in the inner wall of the bushing and bearing against the locator dowel to restrain vertical movement due to gravity;

the locator dowel and bushing being designed to cooperate to accurately position the fixture plate relative to the base plate with the locator dowel extending through the central opening of the bushing and into the hole in the base plate.

13. A locator dowel assembly as claimed in claim 12 wherein the removable stop includes a shoulder screw threadedly engaged in the lower end of the locator dowel and extending over the lower end of the longitudinally extending slot.

* * * * *